(12) United States Patent
Suzuki et al.

(10) Patent No.: US 8,676,054 B2
(45) Date of Patent: Mar. 18, 2014

(54) OPTICAL TRANSMISSION RECEIVER AND METHOD FOR THE SAME

(75) Inventors: Yuichi Suzuki, Kawasaki (JP);
Toshihiro Ohtani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 449 days.

(21) Appl. No.: 12/835,297

(22) Filed: Jul. 13, 2010

(65) Prior Publication Data
US 2011/0019995 A1    Jan. 27, 2011

(30) Foreign Application Priority Data
Jul. 24, 2009 (JP) ................................ 2009-173110

(51) Int. Cl.
*H04J 14/00* (2006.01)
(52) U.S. Cl.
USPC .............................. 398/45; 398/202; 398/213
(58) Field of Classification Search
USPC ................................... 398/32, 33, 34, 212, 45
See application file for complete search history.

(56) References Cited

U.S. PATENT DOCUMENTS

| | | | | |
|---|---|---|---|---|
| 780,400 | A * | 1/1905 | Willard | 68/187 |
| 5,457,555 | A * | 10/1995 | Moriyama | 398/2 |
| 6,341,032 | B1 * | 1/2002 | Fukashiro et al. | 359/337 |
| 6,434,286 | B2 | 8/2002 | Hayashi et al. | |
| 6,903,324 | B2 * | 6/2005 | Tomofuji et al. | 250/214 LA |
| 7,324,189 | B2 * | 1/2008 | Ohtani | 356/73.1 |
| 7,437,074 | B2 * | 10/2008 | Nakamura et al. | 398/82 |
| 7,522,839 | B2 * | 4/2009 | Onaka et al. | 398/83 |
| 7,880,400 | B2 * | 2/2011 | Zhou et al. | 315/247 |
| 8,131,159 | B2 * | 3/2012 | Ohtani | 398/197 |
| 8,169,212 | B2 * | 5/2012 | Rivoir | 324/130 |
| 2001/0030787 | A1 * | 10/2001 | Tajima | 359/128 |
| 2003/0106990 | A1 * | 6/2003 | Tomofuji et al. | 250/214 LA |
| 2003/0117923 | A1 * | 6/2003 | Asada et al. | 369/59.11 |
| 2005/0260001 | A1 * | 11/2005 | Sakamoto | 398/202 |
| 2007/0076269 | A1 * | 4/2007 | Kido et al. | 358/474 |
| 2007/0223921 | A1 * | 9/2007 | Sone et al. | 398/45 |
| 2008/0002978 | A1 * | 1/2008 | Onaka et al. | 398/81 |
| 2008/0056090 | A1 * | 3/2008 | Asada et al. | 369/59.11 |
| 2009/0226167 | A1 * | 9/2009 | Onaka et al. | 398/45 |
| 2010/0027388 | A1 * | 2/2010 | Kudo et al. | 369/47.13 |
| 2012/0315052 | A1 * | 12/2012 | Liu et al. | 398/202 |

FOREIGN PATENT DOCUMENTS

| | | |
|---|---|---|
| JP | 11-017261 A | 1/1999 |
| JP | 2000-13315 A | 1/2000 |
| JP | 2001-339344 A | 12/2001 |

* cited by examiner

*Primary Examiner* — Ken Vanderpuye
*Assistant Examiner* — Amritbir Sandhu
(74) *Attorney, Agent, or Firm* — Fujitsu Patent Center (57) ABSTRACT

There is provided an optical transmission receiver includes an optical switch configured to switch between optical transmission channels, the optical transmission channels being gradually switched from one to the other, an optical amplifier configured to amplify a light propagating in the other of the optical transmission channels which is in a state subsequent to switching, and a switching speed controller configured to control a switching speed of the optical switch based on a level of the light amplified by the optical amplifier.

14 Claims, 9 Drawing Sheets

| OPTICAL INPUT LEVEL | PREDICTABLE MAXIMUM VARIATION | SWITCHING SPEED |
|---|---|---|
| + 2 dBm | 24 dB | X msec |
| ⋮ | ⋮ | ⋮ |
| − 10 dBm | 12 dB | Y msec |
| ⋮ | ⋮ | ⋮ |
| − 21 dBm | 23 dB | Z msec |
| − 22 dBm | 24 dB | X msec |

| DIFFERENCE BETWEEN OPTICAL INPUT LEVELS | TRANSMISSION DISTANCE | COMPENSATION VALUE OF DISPERSION |
|---|---|---|
| ⋮ | ⋮ | ⋮ |
| 10 dB | 50 km | 850 ps/nm |
| 11 dB | 55 km | 935 ps/nm |
| ⋮ | ⋮ | ⋮ |
| 15 dB | 75 km | 1275 ps/nm |
| ⋮ | ⋮ | ⋮ |

OPTICAL TRANSMISSION RECEIVER AND METHOD FOR THE SAME

CROSS-REFERENCE TO RELATED APPLICATION

This application is based upon and claims the benefit of priority of the prior Japanese Patent Application No. 2009-173110, filed on Jul. 24, 2009, the entire contents of which are incorporated herein by reference.

FIELD

The embodiments discussed herein are related to an optical communication receiver and a method for the optical communication receiver.

BACKGROUND

From a viewpoint of a reliable design, an optical transmission apparatus (optical transmission system) is often configured so as to contribute to redundancy in a communication line. One of the redundancy scheme in the communication line will be found in the optical unidirectional path switched ring (OUPSR) scheme. Using switching operation by an optical switch or switches mounted in a receiving side of a transponder unit, the OUPSR scheme carries out a redundancy scheme by a wavelength in an interexchange channel. One of the OUPSR schemes is disclosed in Japanese Laid-open Patent Publication 11-17261.

SUMMARY

According to an aspect of the invention, there is provided an optical transmission receiver includes an optical switch configured to switch between optical transmission channels, the optical transmission channels being gradually switched from one to the other, an optical amplifier configured to amplify a light propagating in the other of the optical transmission channels which is in a state subsequent to switching, and a switching speed controller configured to control a switching speed of the optical switch based on a level of the light amplified by the optical amplifier.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

According increase of distance and complexity of the communication network, the optical communication receiver is desired to process correctly optical signals spreading in a wide dynamic range. Accordingly, optical switching in the OUPSR scheme instantaneously brings on an optical input power variation equivalent to the optical input dynamic range. In the optical transponder having an optical amplifier arranged at a stage prior to the optical receiver, an optical surge may occur in the optical amplifier. It is possible for the optical surge to damage an optical receiving element in the optical receiver.

In a transmission system operating with a low transmission rate, an optical amplifier is not arranged at a stage prior to the optical receiver, because a optical receiver module has a wide dynamic range. Even in a case that the optical amplifier is arranged before the optical receiver, an amount of optical surge suppression in the optical amplifier is not so strictly limited.

For the transmission system responding to characteristics for a high transmission rate operation, the transponder includes optical specific elements such as a wavelength dispersion compensator. This configuration needs an optical amplifier in order to compensate losses caused by optical elements and to adjust a level of a received optical signal within a dynamic range of the receiving module. The high-speed transmission optical module for use of a high transmission rate has not an input dynamic range as wide as that of a low-speed transmission optical module. Accordingly an amount of optical surge as large as that occurred in the low-speed module will be beyond the range of the input dynamic range of the high-speed transmission optical module.

One of ways to suppress the amount of optical surge is to configure a amplifying stage with a plurality of optical amplifiers. However, the optical transponder with a single amplifying stage will be mainly developed in order to reduce a size, power consumption, and cost. A related technology is disclosed in Japanese Laid-open Patent publication 11-17261, which discloses a transmission method for feeding an optical signal to an optical transmission line arranged at a downstream side of an optical amplifying medium and is not applicable to an optical amplifier arranged at a subsequent stage of an optical switches.

Figure 1:
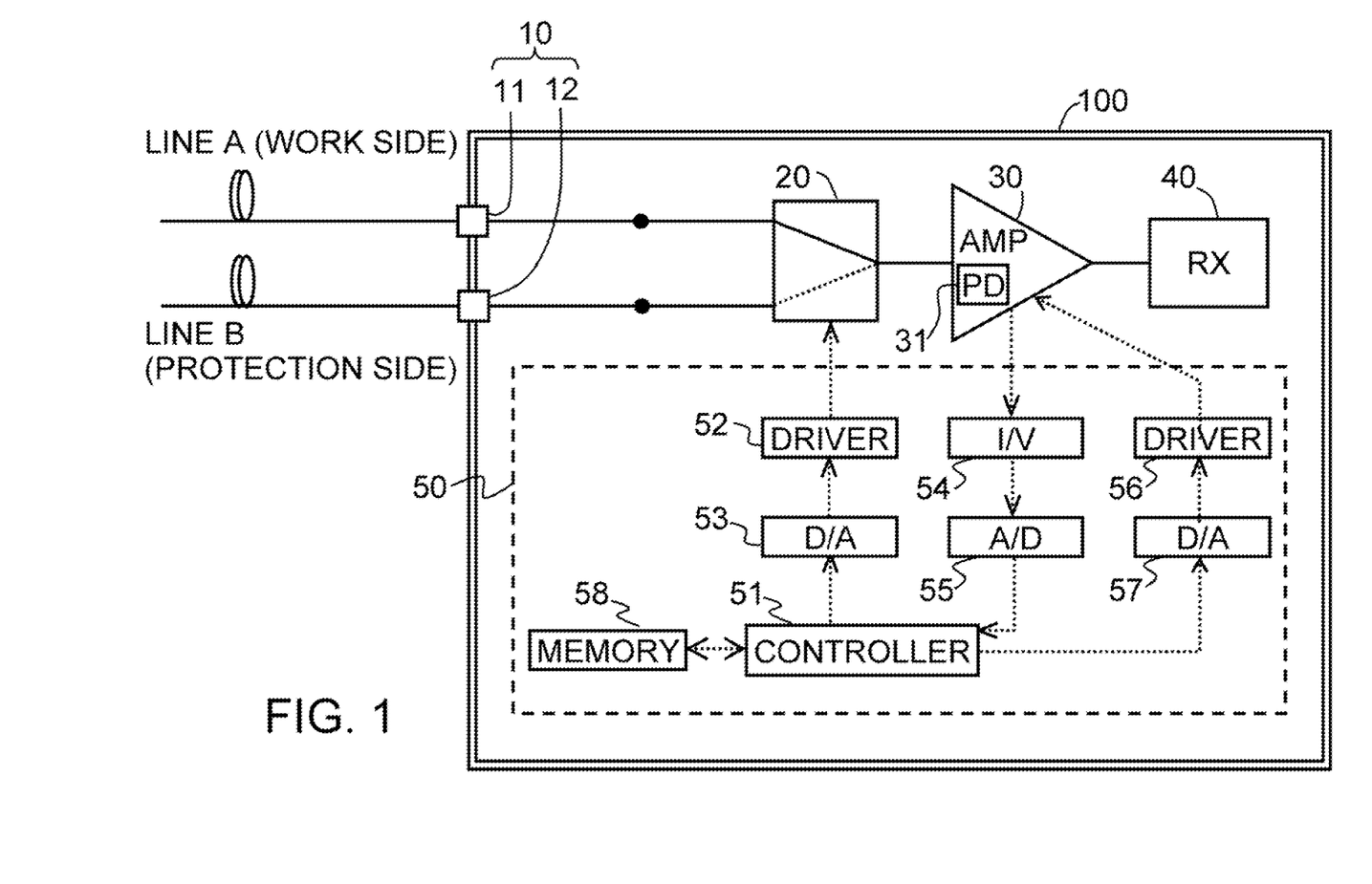
FIG. 1 is a diagram illustrating a whole configuration of an optical transmission receiver according to a first embodiment.

The embodiments will be described with drawings. FIG. 1 is a block diagram illustrating a whole configuration of an optical communication receiver 100 according to a first embodiment. The optical communication receiver 100 is one connected to a redundant channel such as a channel of a work side or a channel of a protection side. As depicted in FIG. 1, the optical communication receiver 100 includes an input receiver 10, an optical switch 20, an optical amplifier 30, an optical receiver 40, and a circuit 50. The circuit 50 includes a controller 51, a driver, a digital-to-analog (D/A) convertor 53, a current-to-voltage (I/V) convertor 54, an analog-to-digital (A/D) convertor 55, a driver 56, a d/a convertor 57, and a memory 58.

The input receiver 10 includes a first input port 11 and a second input port 12. The first input port 11 is connected to a channel A of a work side and the second input port 12 to a channel B of a protection side. The channel of the work side is also called a operation channel and the channel of the protection side is also called a stand by channel or a backup channel.

The optical switch 20 is for switching the transmission channel. In this embodiment, the optical switch 20 operates according to a current fed from the driver 52 to switch between a first transmission line from the first input port 11 to the optical amplifier 30 and a second transmission line from the second input port 12 to the optical amplifier 30. In this operation, the optical switch 20 switches between the first and the second transmission channels in a continuous manner such as an analog manner instead of in a discontinuous manner such as a digital manner. The optical switch 20 operates to receive both lights through the first and the second optical transmission channels and to output a light in which a ratio of both lights is varied. In the case of switching a transmission channel from the first to the second channels, the optical switch 20 operates to increase gradually the ratio of light responding to the light through the second optical transmission channel and to decrease gradually the ratio of light responding to the light through the first optical transmission channel. For this operation, the optical switch of the optical-wave-guided heat-control type such as the planar optical circuit (PLC) is usable.

The optical amplifier 30 is a device for amplifying the received light to output. A rare earth fiber optical amplifier, for example, is usable for the optical amplifier 30, which includes a photo detector 31. The optical amplifier 30 amplifies the light received from the optical switch 20 by a gain according to a excitation light driven by a current supplied by the driver 56 and then outputs the amplified light to the optical receiver 40.

The controller 51 calculates a value of a driving current for driving the optical amplifier 30 and feeds the value of a digital form to the D/A convertor 57 which converts the value of the digital form into a voltage signal and feeds the voltage signal to the driver 56. Then the driver 56 feeds to the optical amplifier 30 a current according to the voltage signal. In the present embodiment, the controller 51 controls the driver 56 so that the intensity of light outputted from the optical amplifier 30 is kept a certain constant value or a value within a certain definite range to be subjected to automatic power control. The combination of the controller 51, D/A convertor 57, and the driver 56 functions as a gain controlling means.

Further, the controller 51 controls, according to the result detected by the photo detector 31, the speed of switching transmission channel performed by the optical switch 20. First, the photo detector 31 feeds, to the I/V convertor 54, a current according to the light intensity inputted into the optical amplifier 30. The I/V controller 54 generates a voltage signal according to the received current and feeds the voltage signal to the A/D convertor 55, which generates a digital signal according to the voltage signal and feeds the digital signal to the controller 51. By receiving the digital signal, the controller 51 may obtain signal corresponding to the light intensity inputted into the optical amplifier 30. Accordingly, the photo detector 31 functions as a light intensity detecting means.

The controller 51 calculates a driving current for driving the optical switch 20 based on the inputted digital signal and then feeds, to the D/A convertor 53, a digital signal corresponding to the calculated driving current. Then the D/A convertor 53 receives the digital signal corresponding to the calculated driving current and converts the digital signal to a voltage signal. The voltage signal is then sent to the driver 52, which generates a driving current according to the voltage signal and feeds the driving current to the optical switch 20. The optical switch 20 switches between the optical transmission channels at a switching speed according to the driving current from the driver 52. Accordingly, in the present embodiment, the combination of the controller 51, the D/A convertor 53, and the driver 52 functions as a switching speed setting means.

For example, in the case that the optical switch 20 is a switch of a optical waveguide heat controlling type, the switching speed for switching between the optical transmission channels of the optical switch 20 may be controlled by controlling a speed of increase or decrease of a current supplied to a heater arranged to the optical waveguide.

Figure 2:
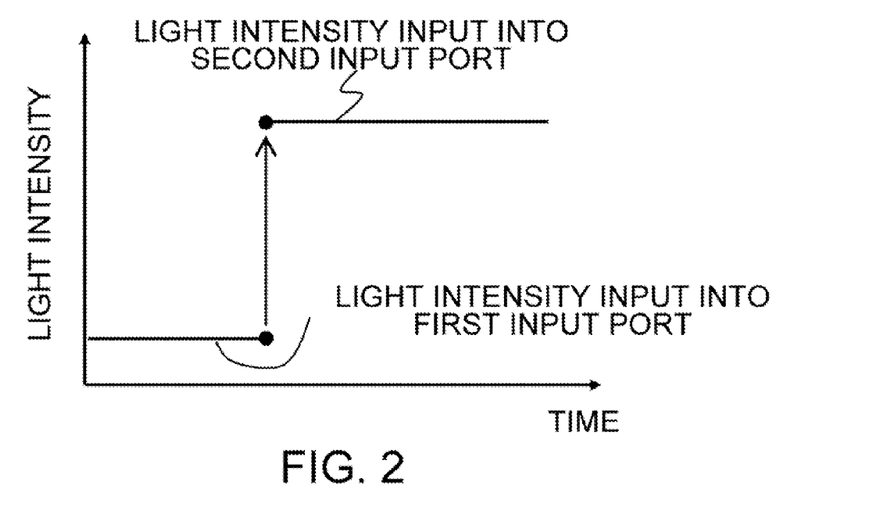
FIG. 2 is a diagram illustrating a light intensity which is input into an optical amplifier in the case of a high switching speed for switching the optical transmission channels.

The switching speed for switching between the optical transmission channels, which is referred to as the switching speed, will be explained below. FIG. 2 is for illustrating the light intensity inputted into the optical amplifier 30 when the switching speed is high. In FIG. 2, a horizontal axis represents time progression and a vertical axis represents light intensity of light outputted from the optical switch 20. In detail, FIG. 2 depicts a graph when the light intensity inputted into the second input port 12 is larger than that inputted into the first input port 11 and the input port of the optical switch 20 will be changed from the first input port 11 to the second input port 12.

FIG. 2 illustrates a relationship between time progress and a light intensity when the switching speed is high. In this case, a fluctuation velocity of the light intensity of the light outputted from the optical switch 20 is large which causes a delay in performing an automatic power (APC) control by the controller 51. Accordingly, the light intensity of the optical signal inputted into the amplifier 30 abruptly increases. In the case that a difference between two intensities is small, where two intensities is of lights inputted into the first input port 11 and the second input port 12, an amount of a surge occurred in the optical amplifier 30 will be small in regardless of the high switching speed. However, according to increase of the difference between two intensities, which is referred to as the difference D, the optical surge occurred more easily.

Figure 3:
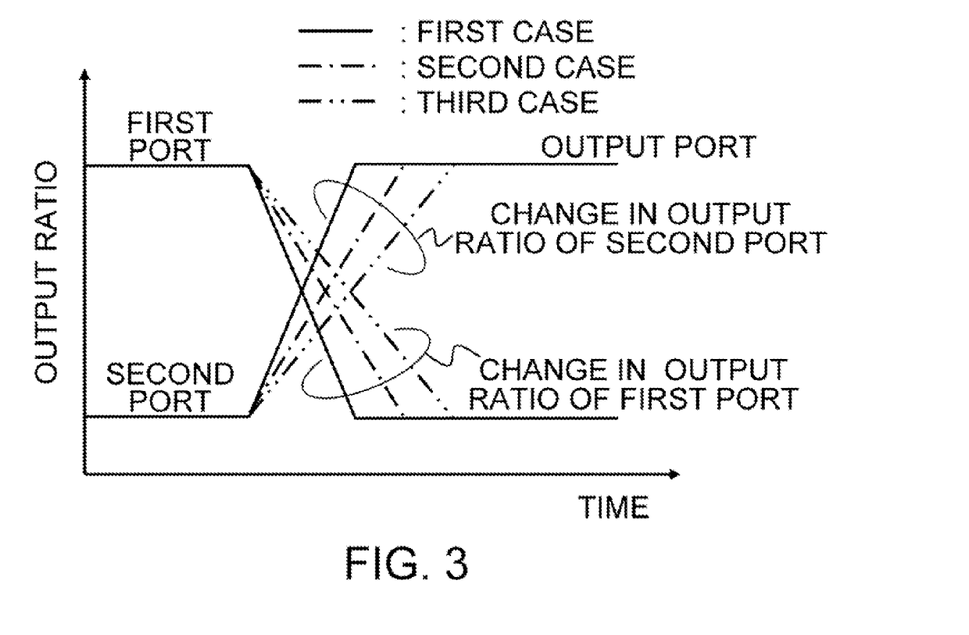
FIG. 3 is a diagram for explaining the switching speed for switching the optical transmission channels.

Accordingly, the controller 51 of the present embodiment controls the switching speed of the optical switch 20 according to the difference D. In more detail, the controller 51 controls the switching speed so that the APC control operates in time to maintain the light intensity outputted from the optical amplifier 30 within an acceptable range of the subsequent optical elements. FIG. 3 explains the switching speed for switching between the optical transmission channels by the optical switch 20. In FIG. 3, a horizontal axis represents time progression and a vertical axis represents ratio of an intensity of each light fed through respective optical channel to an intensity of a light outputted from the optical switch 20.

When the difference D is large, as illustrated with a solid line in FIG. 2, the controller 51 changes at a low changing speed the optical transmission channel passing through the optical switch 20 from the first optical transmission channel to the second optical transmission channel in an analog manner or continuously. In this case, the ratio of the light through the first port gradually decreases in the light outputted from the optical switch 20 and at the same time the ratio of the light trough the second port gradually increases in the light outputted from the optical switch 20.

The dashed line illustrates the second case in which the difference D is larger than that of the first case illustrated with the solid line in FIG. 3. The two-dot chain line illustrates the third case in which the difference D is larger than that of the second case illustrated with the dash line. As illustrated in FIG. 3, the controller 51 controls the changing speed of the second case to be lower than that of the first case. Similarly the controller 51 controls the changing speed of the third case to be lower than that of the second case. By controlling the switching speed in this manner, it is possible to decrease the variation in the output of the optical switch 20 against time. Accordingly, the optical surge in the optical amplifier 30 will be suppressed. The first case may be an example for setting an initial value of the switching speed, instead of an example having a large difference D.

Figure 4:
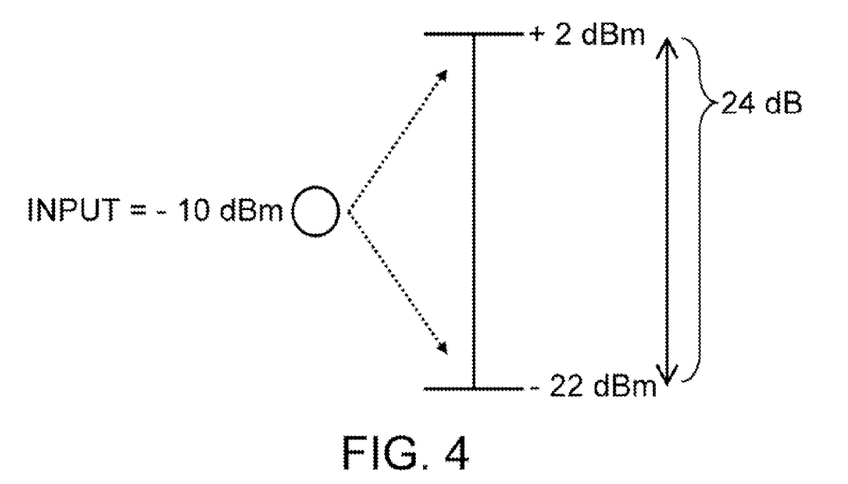
FIG. 4 is a diagram illustrating an example of a relationship between the light intensity of a light input into an optical switch and the switching speed of the optical switch.

FIG. 4 is an example illustrating a relationship between the intensity of a light inputted into the optical switch 20 and a switching speed for switching the optical transmission channels. The photo detector 31 may detect the intensity of the light which is inputted into the optical amplifier 30 from a transmission channel currently being connected. However it is difficult to detect the intensity after switching the optical transmission channel previous to the switching. For preventing an optical surge after switching, the optical controller 51 has a function to estimate the maximum variation of an optical intensity after switching based on the light intensity which is detected currently by the photo detector 31 and to set a switching speed by which an occurrence of the optical surge in the optical amplifier 30 will be prevented after switching the optical transmission channel. Accordingly, the controller 51 functions as a light intensity estimating means.

With reference to FIG. 4, a case for example case will be explained. It is supposed that the optical amplifier 30 has an input dynamic range from −22 dBm to +2 dBm, that is 24 dB and the photo detector 31 receives a light intensity −30 dBm from the first optical transmission channel, as the work side transmission channel, selected by the optical switch 20. In this case, when the optical transmission channel is changed to the second optical transmission channel, 12 dB is the maximum variation of the light intensity inputted into the optical amplifier 30. The controller 51 controls the switching speed of the optical switch 20 so as to limit the optical surge amount within a range allowed by optical elements arranged in a subsequent stage even in the case where a light having the maximum variation 12 dB is received by the photo detector 31.

Figure 5:
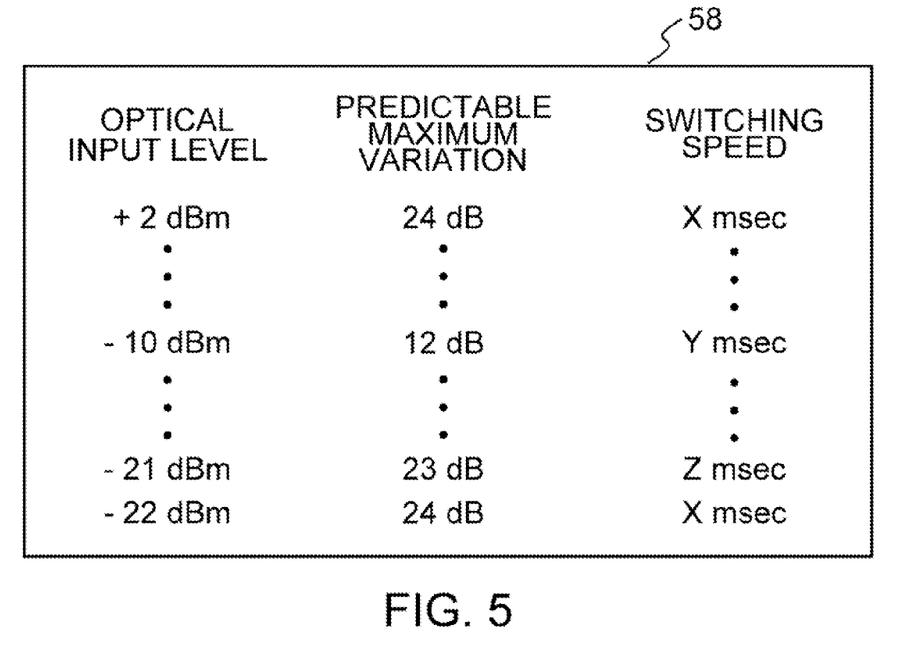
FIG. 5 is a diagram illustrating a set of data stored in a memory.

It is also preferable to preliminarily store in the memory 58 a set of data which is each of combinations between a light intensity detected by the photo detector 31 and a switching speed and then for the controller 51 to read out data of the switching speed stored in the memory 59. FIG. 5 is a diagram illustrating an example of the data stored in the memory 58. With reference to FIG. 5, in the memory 58, the following data is stored: the optical input level such as the light intensity detected by the photo detector 31; a predictable maximum variation of the light intensity; and a switching speed.

Figure 6A:
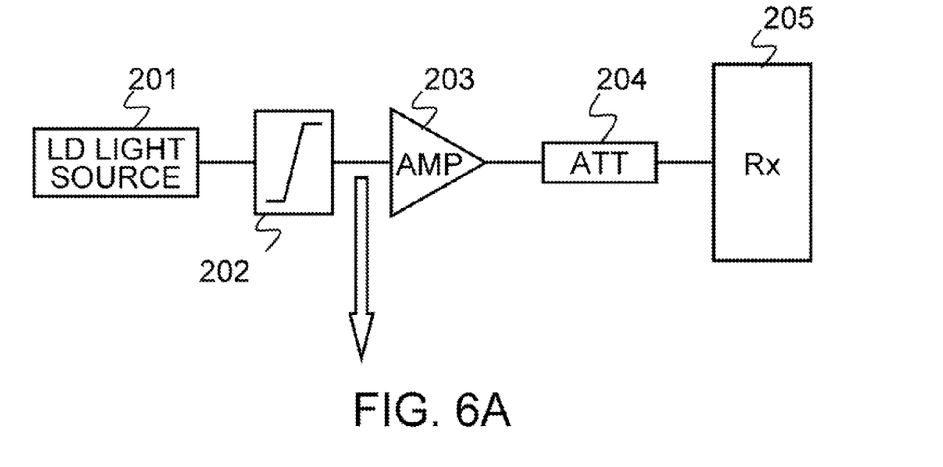
FIGS. 6A and 6B are diagrams explaining an experiment for the switching speed and an amount of surge.

With reference to FIGS. 6A to 7B, explanations will be described for experiences on a relationship between the switching speed and the amount of optical surge. FIG. 6A is a diagram illustrating a configuration of an experiment system 200 which includes a light source or a laser-diode light source 201, an arbitrary waveform generator 202, an optical amplifier 203, an attenuator 204, and an optical receiver 205.

The light source 201 feeds a light to the arbitrary waveform generator 202 which shapes the received light wave to send it to the optical amplifier 203. The optical amplifier 203 amplifies the light form the optical amplifier 203 and sends it to the attenuator 204 which adjusts a light intensity, which is inputted into the optical receiver 205, before the light intensity abruptly changes. The optical receiver 205 receives the light from the attenuator 204.

Figure 6B:
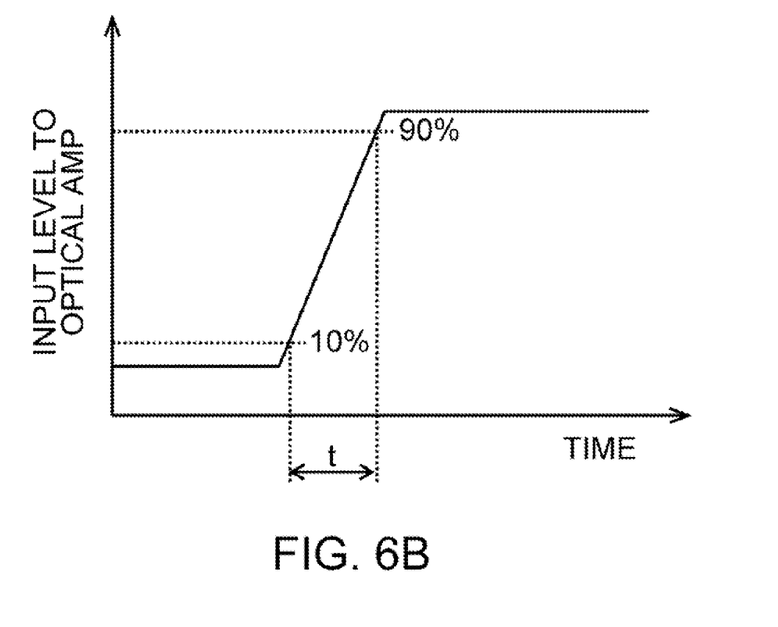

In the experience, using the arbitrary waveform generator 202, an intensity of the light to be received by the optical amplifier 203 was varied from −21.7 dBm to +1.3 dBm, which means that the variation is 23.0 dBm, with many different types of rise times. The rise time is defined as the time between from 10% to 90% of the maximum variation of the intensity of the light as illustrated in FIG. 6B.

Figure 7A:
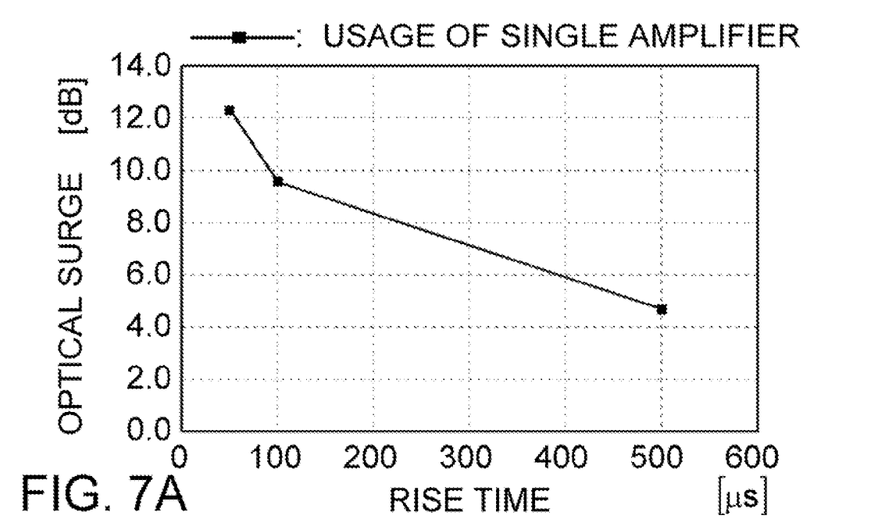
FIGS. 7A and 7B are diagrams explaining a relationship between a rise time and an amount of optical surge.

FIG. 7A is a diagram for explaining the relationship between the rise time Tf and the amount of optical surge in the experiment system 200. As illustrating in FIG. 7A, the amount of optical surge is approximately 12.0 dB when the raise time Tf is 50 µs and the amount of optical surge is approximately 9.6 dB when the raise time Tf is 100 µs.

Figure 7B:
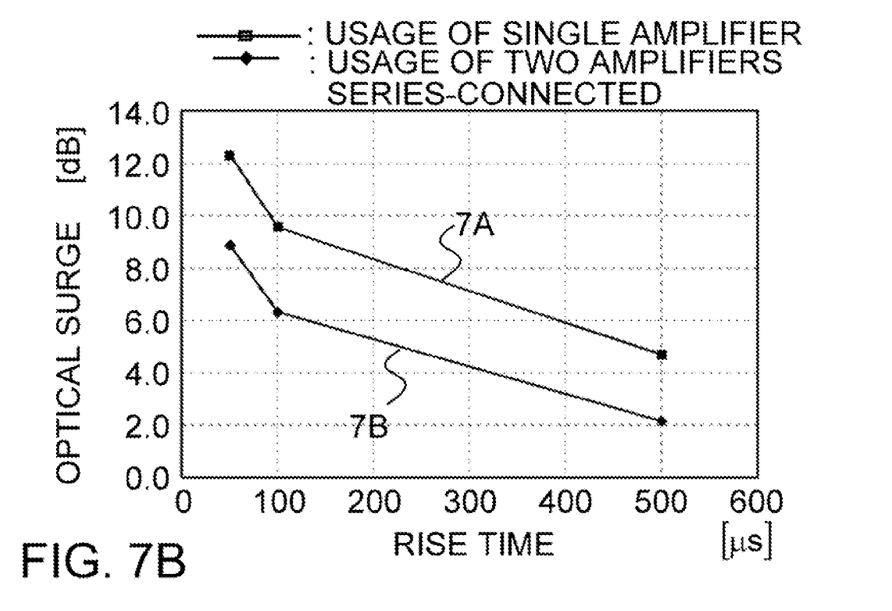

FIG. 7B is a diagram in which two relationships 7A and 7B are depicted, the relationship 7A is same one illustrated in FIG. 7A and the relationship 7B illustrates a relationship between a raise time and an amount of optical surge in the case of the experiment system provided with two optical amplifiers 203 serially connected. As illustrated in FIG. 7B, an arrangement of two optical amplifiers results in the smaller amount of optical surge and the amount of optical surge increases as the rise time shortens. Accordingly, the amount of optical surge increases as the rise time shortens in the each case of using a single amplifier or two amplifiers.

By the results illustrated in FIGS. 7A and 7B, it was found that lengthening the rise time Tf suppresses the amount of optical surge and results in decrease of the failures in an optical receiver. Accordingly, it was found that the occurrence of the optical surge is suppressed by setting slower the speed of switching the optical transmission channel as the difference D becomes larger.

The optical communication receiver 100 according the present embodiment, which is preferably connected to a network configured with a redundancy, may suppress the optical surge in the optical amplifier 30 arranged herein by changing the switching speed, for switching the optical transmission channel, of the optical switch 20. Further, the optical surge in the optical amplifier 30 is also effectively suppressed by setting the transmission-channel switching speed according to results obtained by the photo detector 31. Still further, the optical surge in the optical amplifier 30 may be suppressed more effectively by setting slower the transmission channel switching speed as the difference D becomes larger.

Second Embodiment

Figure 8:
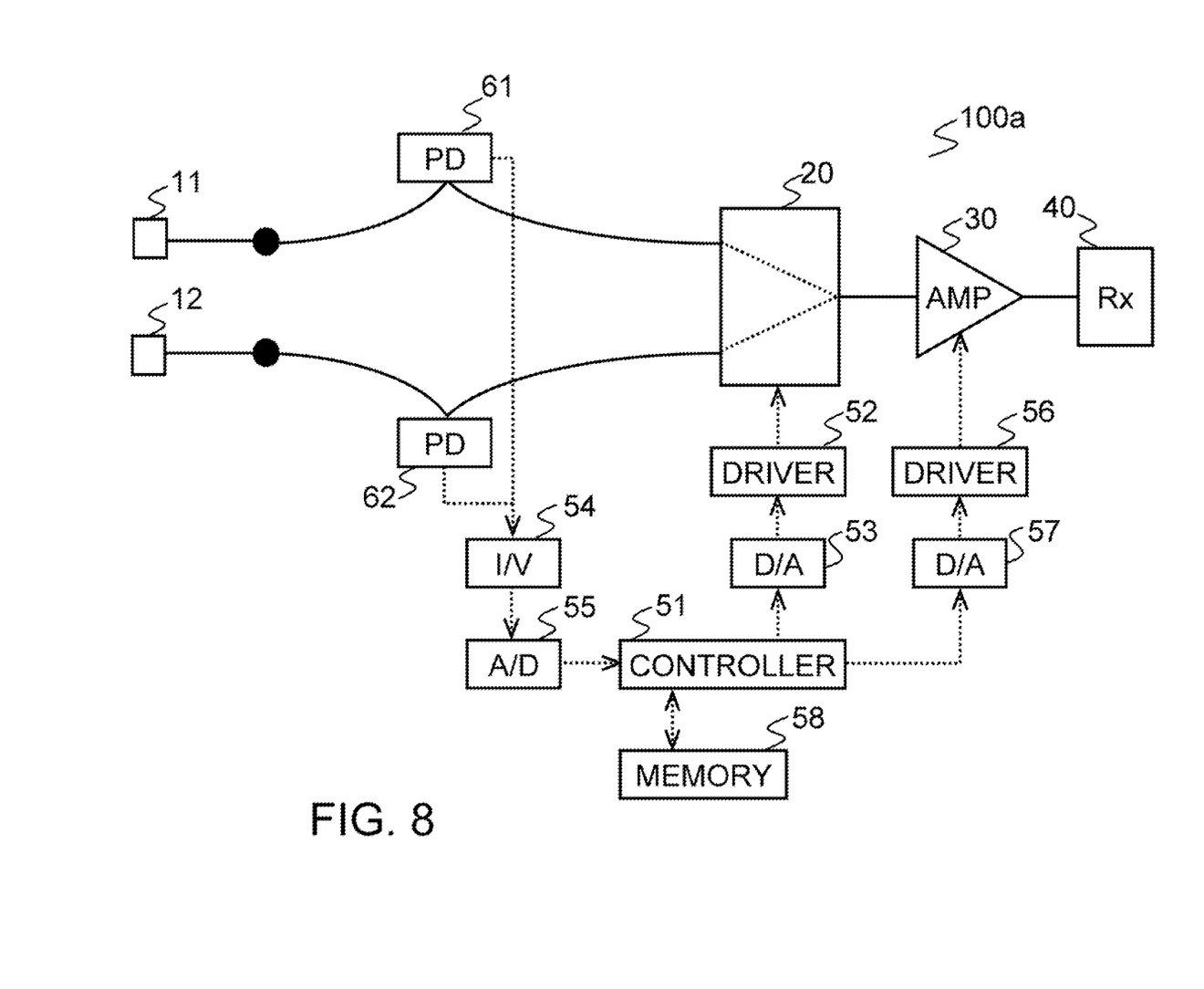
FIG. 8 is a diagram illustrating a whole configuration of an optical transmission receiver according to a second embodiment.

FIG. 8 is a block diagram for explaining a whole configuration of an optical communication receiver 100a according to the second embodiment. The optical communication receiver 100a differs from the optical 100 in that photo detectors 61 and 62 are arranged instead of the photo detector 31 of the optical communication receiver 100. The photo detector 61 is arranged between the first port 11 and the optical switch 20 and the photo detector 61 between the second port 12 and the optical switch 20.

In the optical communication receiver 100a, since each of the photo detectors 61 and 62 detect a respective light intensity of a light passing through the channel, the difference D may be detected accurately. The optical transmission switching speed may be optimized by setting the optical transmission switching speed based on the difference D accurately detected. Accordingly, the optical surge may be effectively suppressed.

Third Embodiment

Figure 9:
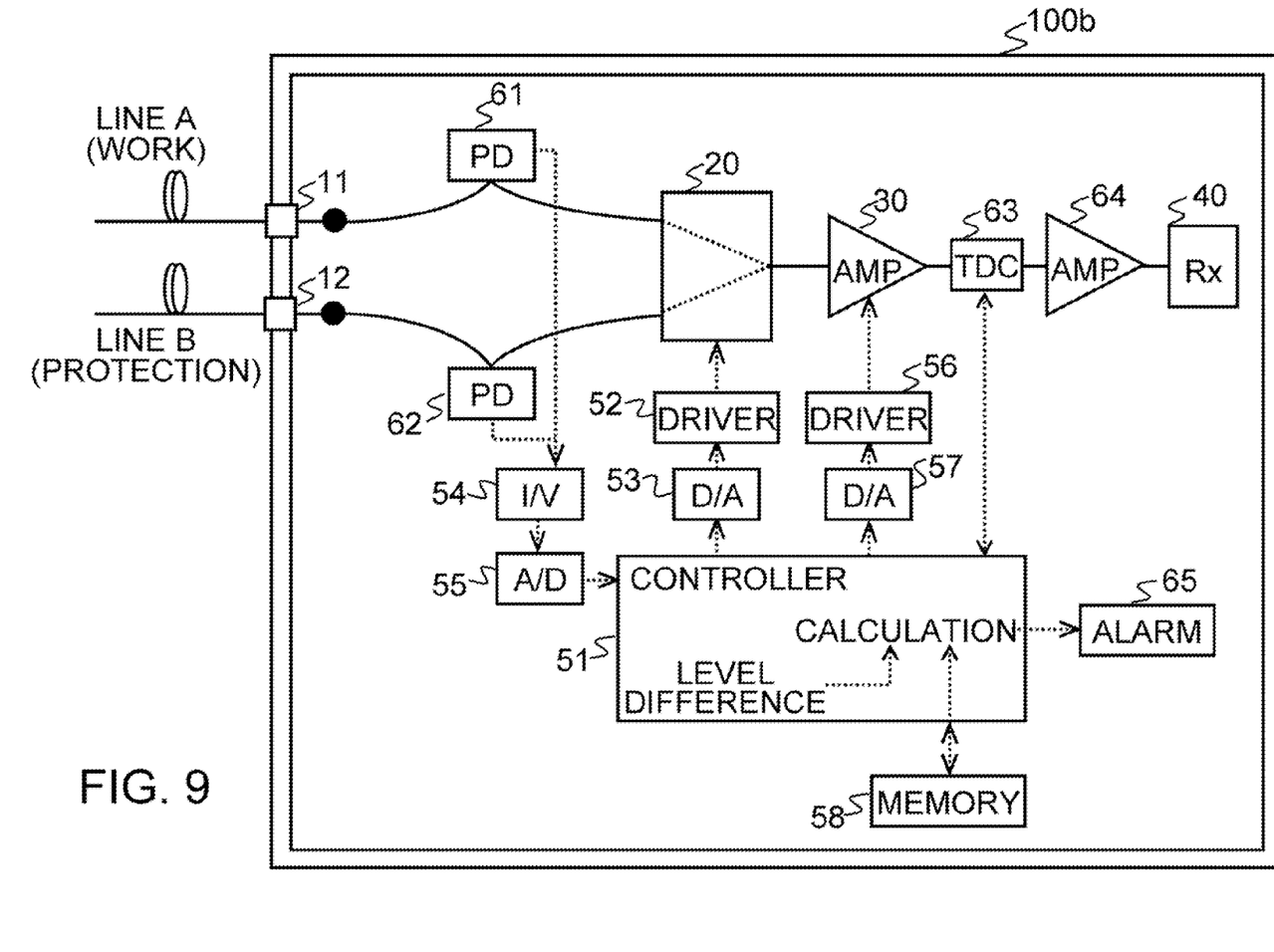
FIG. 9 is a diagram illustrating a whole configuration of an optical transmission receiver according to a third embodiment.

FIG. 9 is a block diagram for explaining a whole configuration of an optical communication receiver 100b according to the third embodiment. The optical communication receiver 100b differs from the optical communication receiver 100a illustrated in FIG. 8 in that a tunable dispersion compensator (TDC) 63, an optical amplifier 63, and an alarm 65 are provided, where TDC 63 and the optical amplifier 63 are arranged between the optical amplifier 30 and an optical receiver 40 and the alarm 65 is connected to the controller 51. As illustrated in FIG. 9, the output light of the amplifier 30 is fed to TDC 63, and the output light of the TDC 63 is fed to optical amplifier 64, and the output light of the optical amplifier 64 is fed to the optical receiver 40.

In the present embodiment, the controller 51 detects the difference D based on the results detected by the photo detectors 61 and 62. Further the controller 51 estimates a variation of an amount of wavelength dispersion based on the difference D detected by both of the photo detectors 61 and 62. Concurrently with switching the optical transmission channel, the controller 51 sets data corresponding to the amount of wavelength dispersion into the TDC 63 with a coarse accuracy in a feedforward control manner. By this procedure, it may shorten the time until the signals for transmission may be received again after switching the optical transmission channel. In the present embodiment, the controller 51 functions as the variation estimating means and as the estimating means for amount of dispersion.

Subsequent to setting the data with a coarse accuracy, it is preferable to set or adjust TDC 63 in an optimization or fine manner for minimizing a bit error. A sign to be added to the data corresponding to the amount of dispersion to be set into TDC 63 is opposite in that of the wavelength dispersion. For example, when the amount of wavelength occurring in the optical transmission channel is +1000 ps/nm, the value to be set into the TDC 63 is −1000 ps/nm.

Several tens of seconds will be required for an optimal adjustment including a coarse and a fine adjustments by repeating the procedures of setting an amount of wavelength dispersion into TDC 63 and checking the bit error rate in order to decrease the bit errors to a minimum value. However, since the present embodiment may perform the coarse adjustment in a short time, the required time to set an optimal amount of dispersion may be shorten.

An example will be explained below, assuming that XXXps/nm, where XXX is an appropriate, is a setting value of dispersion in TDC 63 when the light intensity inputted to the first port 11 is −10 dBm, and the light intensity inputted to the second port 12 is −20 dBm.

In this case with the assumption described above, the variation of the light intensity decreases by 10 dB when the optical transmission channel is switched from the first channel to the second channel. A transmission distance increases approximately by 50 km owing to the 10 dB decrease under the assumption of 0.2 dB/km as a loss of transmission channel. In the case where a single mode fiber is used as an optical transmission channel, 50 km of the transmission distance is equivalent to an amount of residual dispersion shift 850 ps/nm. Accordingly, it is preferable to set for a coarse adjustment an amount of dispersion (XXX−850)ps/nm into TDC 63.

Figure 10:
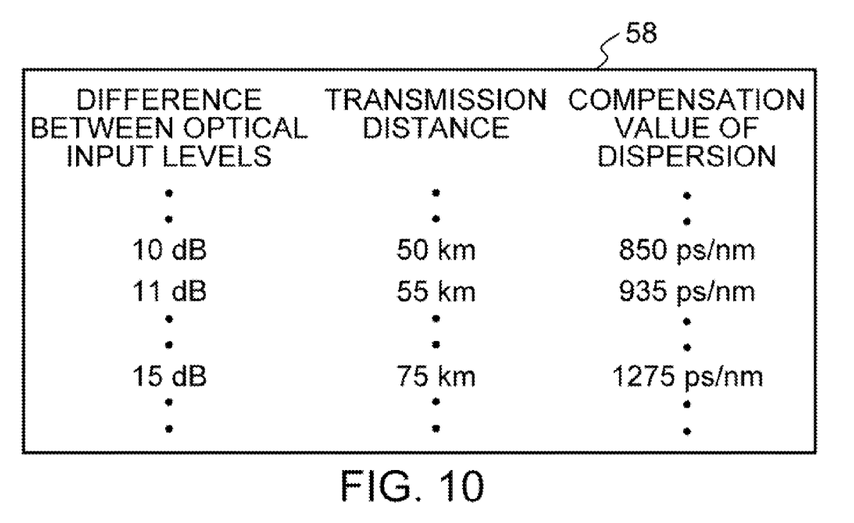
FIG. 10 is a diagram illustrating a set of data stored in a memory.

It is preferable to store preliminary in the memory 58 a combination of data configured with the items such as a difference between light intensities detected by the photo detectors 61 and 62, an approximate transmission distance corresponding to the difference, and an amount of compensation to be set. The controller 51 reads out the data of the amount of compensation for setting the data in to the TDC 63. FIG. 10 is a diagram for explaining a set of data, as an example, stored in the memory 58, where the set of data includes a difference between light intensities detected by the photo detectors 61 and 62, an approximate transmission distance corresponding to the difference, and an amount of compensation.

There might be a case in which a resultant compensation value, which is calculated by the controller 52 to be set into the TDC 63 after the changing the optical transmission channel, exceeds an allowable range of values to be set in TDC 63. In this case, it is preferable for the optical communication receiver 100b to alert preliminarily the user to occurrence of an exceptional event.

Figure 11:
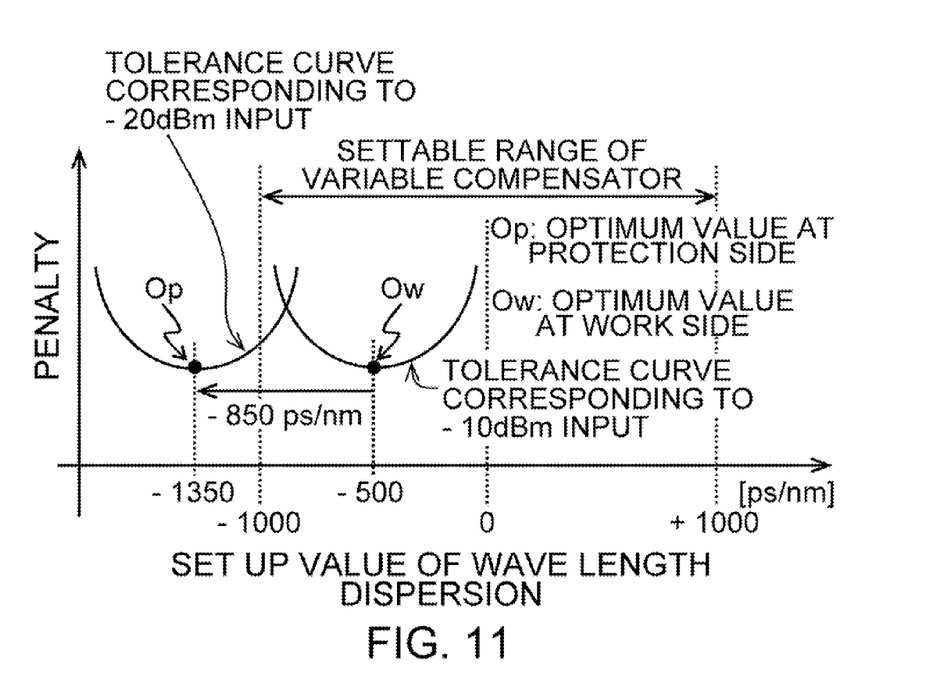
FIG. 11 is a diagram for explaining the case where an amount of dispersion exceeds a range for a maximum dispersion compensation.

FIG. 11 is a diagram for explaining that the dispersion value to be set exceeds a range within which a value may be allowable to be set into TDC 63 for compensating the dispersion. In the case where TDC 63 has a maximum range of wavelength compensation from −1000 ps/nm to +1000 ps/nm, it is supposed that the light intensity input to the first input port 11 is −10 dBm and an dispersion set in TDC 63 is −500 ps/nm. In this case, if the light intensity input to the second input port 12 is −20 dBm, the variation of the light intensity caused by the channel switching decreases by 10 dBm.

An approximate transmission distance to be corresponding to the decrease of 10 dBm is 50 km under an assumption of the transmission loss of 0.2 dB/km. Using SMF optical transmission channel, 50 km is corresponding to 850 ps/nm as an amount of residual dispersion shift. Accordingly, −1350 ps/nm (=−500 ps/nm−850 ps/nm) should be set to DTC 63 just after switching the optical transmission channels by the optical switch 20. However, −1350 ps/nm exceeds the range from −1000 ps/nm to +1000 ps/nm which is allowable range for compensation of dispersion. In this situation, the controller 51 sends to the alarm 65 a signal for alerting the user to the occurrence of an exceptional event.

Fourth Embodiment

Figure 12:
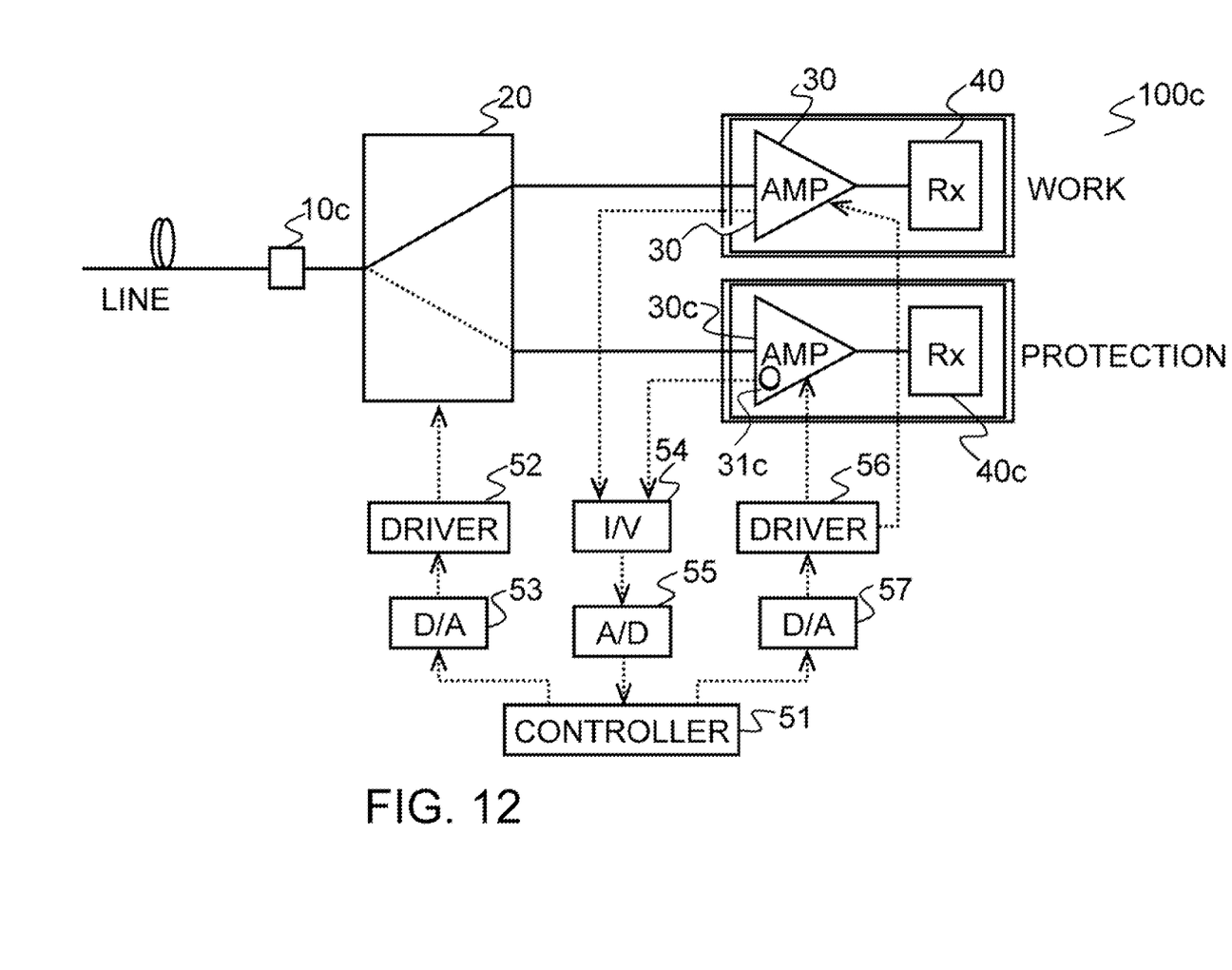
FIG. 12 is a diagram for illustrating a whole configuration of an optical transmission receiver according to a fourth embodiment.

FIG. 12 is a diagram for explaining a whole configuration of an optical communication receiver 100c. The optical communication receiver 100c is connected to a single transmission line and includes two sets for a redundancy configuration, each set includes an optical amplifier and an optical receiver. As illustrated in FIG. 12, the optical communication receiver 100c differs from the optical communication receiver 100, illustrated in FIG. 1, in that the optical communication receiver 100c includes an input receiver 10c instead of the input receiver 10 and further includes an optical amplifier 30c and an optical receiver 40c. The optical amplifier 30c includes a photo detector 31c.

The optical switch 20 in the present embodiment is arranged so that the direction is opposite in the direction of the optical switch 20 in the optical communication receiver 100 illustrated in FIG. 1. The optical switch 20 switches between a first optical channel and the second channel, where the first channel is from the first optical receiver 10c to the optical amplifier 30 and the second channel from the second optical receiver 10c to the optical amplifier 30c. The first and second channels are referred to as a work side channel and a protection side channel respectively.

Under the control of the controller 51, the driver 56 performs a hot standby operation in which the excitation light of the amplifier 30c is maintained in a lighting state. By this performance, it is possible to shorten the rise tine of the amplifier 30c. However, the optical amplifier 30c will be affected by an abrupt change of a light intensity inputted therein. As a result, an optical surge will occur.

In the present embodiment, the controller 51 changes the changing speed performed in the optical switch 20 so that the optical transmission channel is changed during a time longer than a time required to perform the APC control loop. According to this performance, the optical surge in the optical amplifier 30 may be suppressed.

As explained above, according to an optimal switching speed for switching the optical transmission channels, it may be possible to suppress the optical surge potentially occurred in an optical amplifier arranged on a stage subsequent to an optical switch. Therefore, it may be possible to adopt a redundancy configuration with maintaining the optical amplifier in a state of a standby. As a result, it may be possible to perform a shortage of a rise time of a unit of the protection side.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical transmission receiver comprising:
    an optical switch configured to switch between optical transmission channels, the optical transmission channels being gradually switched from one to the other;
    an optical amplifier configured to amplify a light propagating in the other of the optical transmission channels which is in a state subsequent to switching; and
    a switching speed controller configured to control a switching speed of the optical switch based on a level of the light amplified by the optical amplifier.

2. The optical transmission receiver according to claim 1, further comprising a gain controller configured to control a gain performed by the optical amplifier in order to maintain a value of a light intensity in a certain value or a value within a certain range, the light intensity being a intensity of a light outputted from the optical amplifier.

3. The optical transmission receiver according to claim 1, further comprising:
    a photo detector configured to detect a light intensity, the light intensity being an intensity of a light inputted in the optical amplifier and the light being propagating in an optical transmission channel in a state previous to switching,
    wherein the switching speed controller controls the switching speed based on a resultant light intensity detected by the photo detector.

4. The optical transmission receiver according to claim 3, further comprising: a light intensity estimator configured to estimate a difference between light intensities based on a result detected by the photo detector, the light intensities being intensities of lights inputted into the optical amplifier, one of the lights being propagating in a optical transmission channel in a state previous to switching and the other of the lights being propagating in the optical transmission channel in a state subsequent to switching,
    wherein the speed controller controls the switching speed based on a resultant difference between light intensities detected by the photo detector.

5. The optical transmission receiver according to claim 3, wherein the optical switch has a plurality of input ports and each light intensity of a light propagating through one of the ports is detected by a respective photo detector of the photo detectors.

6. The optical transmission receiver according to claim 5, wherein the speed controller controls the switching speed based on a difference between the light intensities of lights inputted in each of the plurality of the input ports.

7. The optical transmission receiver according to claim 4, wherein the speed controller controls the switching speed so that the gain controller controls the gain in order to maintain the value of the light intensity within an allowable range, where the light intensity is the intensity of the light outputted from the optical amplifier.

8. The optical transmission receiver according to claim 4, wherein the speed controller decreases the switching speed as the difference is large.

9. The optical transmission receiver according to claim 3, further comprising:
    a memory configured to store a set of data of the light intensity detected by the photo detector and the switching speed corresponding to the light intensity,
    wherein the switching speed controller controls the switching speed based on the set of data.

10. The optical transmission receiver according to claim 4, further comprising:
    a variation estimator configured to estimate an optimal amount for compensating a wavelength dispersion based on the difference; and
    a dispersion amount controller configured to control an amount of dispersion set in a tunable dispersion compensator based on a result estimated by the variation estimator, the tunable dispersion compensator arranged at a stage subsequent to the optical amplifier.

11. The optical transmission receiver according to claim 10, further comprising:
    a memory configured to store a set of data of the optimal amount estimated by the variation estimator and the amount of the dispersion corresponding to the optimal amount,
    wherein the dispersion amount controller controls the amount of dispersion based on the data stored in the memory.

12. The optical transmission receiver according to claim 10, further comprising:
    an alarm configured to alert occurrence when an amount of dispersion controlled by the dispersion amount controller exceeds a range preliminary set.

13. The optical transmission receiver according to claim 2, wherein the gain controller controls the optical amplifier in a state of hot standby and the speed controller controls the switching speed so that the optical transmission channel is switched in a period longer than a period required in an automatic power control in the optical amplifier performed by the gain controller.

14. An optical receiving method in an optical transmission receiver, the method comprising:
    controlling, with a switching speed controller, a switching speed of an optical switch for switching optical transmission channels based on a level of light amplified by an optical amplifier; and
    switching the optical transmission channels.

* * * * *